(12) United States Patent
Kasralikar et al.

(10) Patent No.: US 8,135,007 B2
(45) Date of Patent: Mar. 13, 2012

(54) METHOD AND MECHANISM FOR PORT REDIRECTS IN A NETWORK SWITCH

(75) Inventors: Rahul S. Kasralikar, San Jose, CA (US); Ram Krishnan, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1277 days.

(21) Appl. No.: 11/772,061

(22) Filed: Jun. 29, 2007

(65) Prior Publication Data

US 2009/0003317 A1    Jan. 1, 2009

(51) Int. Cl.
*H04L 12/56* (2006.01)
*G08B 23/00* (2006.01)

(52) U.S. Cl. .......................... 370/389; 370/401; 726/22
(58) Field of Classification Search ........................ None
See application file for complete search history.

(56) References Cited

U.S. PATENT DOCUMENTS

| | | | | |
|---|---|---|---|---|
| 6,854,063 | B1 * | 2/2005 | Qu et al. ...................... | 370/392 |
| 7,640,434 | B2 * | 12/2009 | Lee et al. ..................... | 726/3 |
| 2004/0093513 | A1 | 5/2004 | Cantrell et al. | |
| 2005/0265248 | A1 | 12/2005 | Gallatin et al. | |
| 2006/0050719 | A1 * | 3/2006 | Barr et al. .................... | 370/401 |
| 2006/0140181 | A1 * | 6/2006 | Trumper et al. ............. | 370/389 |
| 2007/0169169 | A1 * | 7/2007 | Zheng et al. ................. | 726/1 |
| 2008/0163333 | A1 * | 7/2008 | Kasralikar .................... | 370/412 |

FOREIGN PATENT DOCUMENTS

| WO | WO 2007/070838 A | 6/2007 |
|---|---|---|
| WO | WO-2007070838 | 6/2007 |

OTHER PUBLICATIONS

International Search Report and Written Opinion from PCT/US2008/007876 mailed Dec. 19, 2008, 15 pgs.
"PCT, International Preliminary Report on Patentability (Chapter I of the Patent Cooperation Treaty) for Application No. PCT/US2008/007876", Mailed Jan. 14, 2010, Whole Document.
Communication pursuant to Article 94(3) EPC for European Patent Application No. 08768754.7, Mailed Mar. 8, 2011, 5 pages.

* cited by examiner

*Primary Examiner* — Chirag Shah
*Assistant Examiner* — Joshua Smith
(74) *Attorney, Agent, or Firm* — Blakely Sokoloff Taylor & Zafman, LLP

(57) ABSTRACT

A method for selectively redirecting a data packet to a port on a switching device which is associated with a corresponding network service. In one embodiment, the data packet is redirected to an intrusion prevention service (IPS) for security analysis of the data packet. In another embodiment, the switching device performs a data link layer redirecting of the data packet based at least in part on whether the data packet is to be flooded from the switching device.

28 Claims, 5 Drawing Sheets

METHOD AND MECHANISM FOR PORT REDIRECTS IN A NETWORK SWITCH

BACKGROUND OF THE INVENTION

1. Field of the Invention

The invention relates generally to port redirection of data packets in a switched network. More particularly, an embodiment of the invention selectively redirects a data packet to a redirect port of a switching device which is associated with a network service.

2. Background Art

The volume and variety of malware poses an ever-increasing threat to switched networking systems. Protection of switched networking systems is enhanced by intelligent network switches capable of collecting and evaluating data on incoming network traffic for modification of switching behavior. The benefits of intelligent switching are enhanced still further by leveraging external network services such as intrusion prevention systems ("IPSs") to provide security and/or other services to a network switch without being physically in-line with a network traffic flow. "IPS" is understood in the networking arts to refer to a mechanism which may exercise access control to protect devices from security threats.

Network switches and/or other network switching devices can variously filter, redirect, block, and/or forward network traffic based on one or more network conditions. For example, a switch may be configured to redirect a particular data packet to an external network service such as an IPS for inspection, the redirecting based on a traffic type of the data packet (e.g. a mail message service of the data packet). After a satisfactory inspection, this external service may return the redirected data packet to the switch in order to continue the sending of the inspected data packet to its originally intended destination.

The redirecting of a data packet to a "bump-in-the-wire" network service may be complicated, where one or more data packets are to be "flooded" from the switching device. As used herein, flooding a data packet from a switch refers generally to sending the data packet on many network paths in the absence of an indication that the data packet should instead be sent on a particular one or more network paths. Media Access Control (MAC) broadcasting on the data link layer and Internet Protocol (IP) multicasting on the network layer are just two examples of how network traffic may be flooded from a switching device.

The flooding of a previously redirected data packet may cause copies of the data packet to be sent incorrectly. For example, if a redirected data packet were to be flooded from a switch after being returned from an IPS to the switch, the returned data packet may be incorrectly sent back along a network path from which the data packet was originally received by the switching device. Alternatively or in addition, the returned data packet may be incorrectly sent back to the same network service from which it was returned, creating a data packet loop in the network. Network loops and other incorrect sending of data packets result in slower transmit times and reduced network performance. The problem of flooded traffic has to date prevented implementation of a data link layer redirect of data packets to a port of a switching device which is associated with a network service analyzing data packets received by the switching device.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
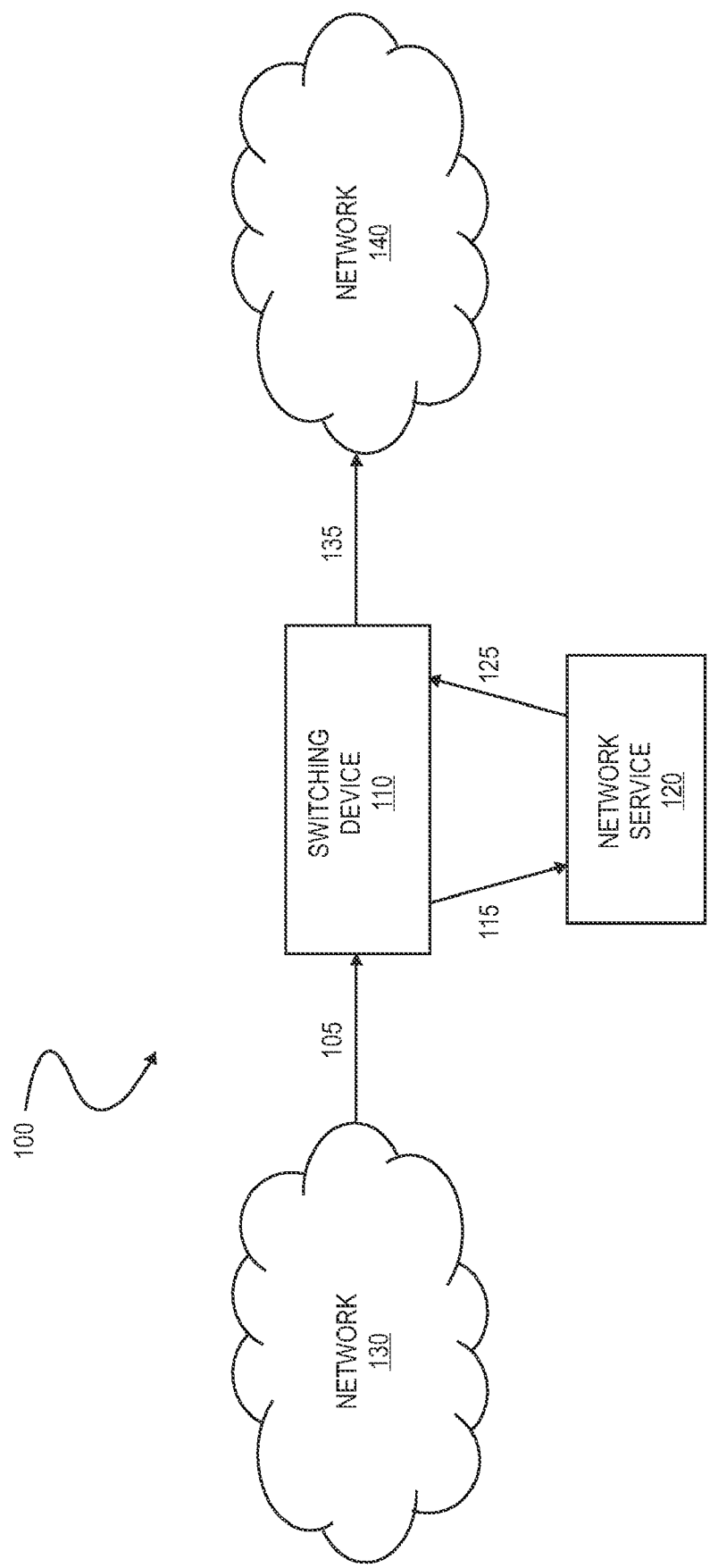
FIG. 1 is a block diagram illustrating a system wherein a switching device may perform a port redirect of a data packet according to one embodiment of the invention.

FIG. 1 illustrates a system 100 wherein a switching device 110 may selectively redirect data packets according to one embodiment of the invention. System 100 may represent any of a variety of "bump-in-the-wire" configurations, wherein data packets from received network traffic may be selectively redirected at least temporarily to a port of switching device 110 associated with an external network service 120. Networks 130 and 140 represent, respectively, a source network from which switching device 110 receives a data packet, and a destination network to which switching device 110 selectively sends the received data packet. Networks 130 and 140 are shown as distinct networks to help demonstrate how switching device 110 may redirect a received data packet according to one embodiment of the invention. It is understood to one of ordinary skill in the relevant art that switching device 110 may also send and/or selectively redirect network traffic from network 140 to network 130. It is also understood to one of ordinary skill in the networking arts that networks 130 and 140 may represent arbitrary parts of a larger single network (not shown), to which switching device 110 also belongs. For example, networks 130, 140 may further be connected to additional devices, networks and/or each other via one or more other network paths (not shown).

Network switch 110 represents any network device having a network switching capability. For example, switching device 110 may include a mechanism to switch a data packet at a data link layer such as that represented by Open Systems Interconnection (OSI) layer 2 (L2). In some embodiments, switching device 110 may include intelligent switching mechanisms to switch a data packet based at least in part on a condition of the network. Switching device 110 may be either a simple L2 network switch or any of a variety of other devices which may include additional routing or other networking capabilities. For example, switching device 110 may be a multi-layer switch (MLS), a hybrid OSI L2/L3 switch router, or other network device having a switching capability. For brevity, embodiments of the invention are described herein with reference to a "switch". One of ordinary skill in the relevant art will appreciate that references to a switch in relation to an embodiment of the invention may be extended to apply more generally to a switching devices of the type discussed above.

Switching device 110 is further connected to network service 120. Network service 120 may be any of a variety of security or other services which are based at least in part on an analysis of one or more data packets received by switching device 110. Network service 120 may include any combination of hardware, software, virtual machine(s), and/or other means for analyzing the one or more data packets received by switching device 110. Analysis of the one or more data packets may include, for example, an analysis of the contents of individual data packets and/or statistical analysis of redirected network traffic over time. In one embodiment, network service 120 may provide an intrusion prevention service (IPS) to detect security threats found in network traffic of switching device 110. The analysis provided by network service 120 may, for example, be referred to in implementing a quality of service (QoS) for network traffic. For example, network service 120 may be used to support a quality of service implemented by mechanisms in switch 110. For brevity, embodiments of the invention will be discussed herein with reference to an "IPS". One of ordinary skill in the relevant art will appreciate that references to an IPS in relation to an embodiment of the invention may be extended to apply more generally to a network service of the type discussed above.

It should be noted that switching device 110 and network service 120 may represent only one of many "bump-in-the-wire" configurations in system 100. For example, switching device 110 may be supported by one or more other network services (not shown) coupled to switching device 110 in a configuration similar to that of network service 120. Furthermore, network service 120 may additionally be configured as a "bump-in-the-wire" for network traffic carried in other network devices. For the sake of brevity, discussions of the invention herein will be limited to variations of the exemplary system 100 shown in FIG. 1, although these discussions may be extended to apply generically to any given "bump-in-the-wire" network service analyzing data packets received by a given switching device.

An embodiment of the invention selectively performs a data link layer redirect of a data packet to a port associated with an IPS. For the sake of clarity, "redirecting a data packet" refers herein to the sending of the data packet on a different network path, at least temporarily, instead of directing the data packet on any of the one or more destination paths to which the data packet was otherwise meant to be sent. In other words, the data packet may be said to be "directed" to a destination path if it is never "redirected" on a different non-destination path. A data packet may be described as a data packet "to be directed" to a destination path, even though the switching device 110 may ultimately determine that the data packet is instead to be redirected to another path. Similarly, a data packet may be described as a data packet "to be redirected" to a redirect port, for example, even though the switching device 110 may ultimately determine that the data packet is instead to be directed to a destination path.

A data link layer redirect may alternatively be referred to herein as a "port redirect", insofar as switching device 110 selectively redirects the data packet to a particular port of switching device 110. At 105, switch 110 receives a data packet from the network 130, the data packet to be directed to one or more destinations in network 140. From switching device 110, the data packet may be directed to network 140, wherein the switching device 110—without first redirecting the data packet to a network service—switches the data packet directly to ports of switching device 110 which are associated with one or more destinations of the data packet in network 140.

Alternatively, from switching device 110, the data packet may be redirected to network service 120, at 115, wherein a switching mechanism of switching device 110 switches the data packet to a redirect port of switching device 110 which is associated with network service 120, instead of directing the data packet to network 140. This redirecting of the data packet 115 may be based at least in part on a network condition, as discussed herein. Where a data packet is redirected from switching device 110 to a redirect port associated with network service 120, an analysis of the redirected data packet may be performed by network service 120. Based at least in part on a result of the performed analysis, the redirected data packet may be returned, at 125, from the network service 120 to the switching device 110. In one embodiment of the invention, any returned data packet may be sent from switching device 110 to at least one of the one or more destinations in network 140. In FIG. 1, communication 135 represents generally the forwarding of a data packet to network 140. For example, communication 135 may represent (1) the directing of a received data packet from switching device 110 to network 140 or (2) the sending of a returned data packet from switching device 110 to network 140.

To redirect network traffic to network service 120, switching device 110 may include at least one port, referred to herein as a redirect port, which is associated with network service 120. Communications 115 and 125 may occur on either a single redirect port of switching device, or on separate egress and ingress redirect ports, respectively, associated with network service 120. In one embodiment of the invention, whether or not the switching device 110 redirects the received data packet to the redirect port is based at least in part on a network condition. In other words, the existence of a network condition may indicate to switching device 110 that the received data packet is associated with a redirect port of switching device 110 which is in turn associated with network service 120.

In one embodiment, the network condition may be a condition of the data packet itself. For example, the network condition may be a type of traffic which the data packet represents. This traffic type of the data packet may be indicated by information contained in the data packet itself. For example, the traffic type of the data packet may be based on information which includes, but is not limited to, a network source identifier of the data packet, a network destination identifier of the data packet, a protocol type of the data packet, a service type of the data packet, and/or an application associated with the data packet. The traffic type may be indicated by data link layer information, network layer information and/or other OSI layer information in the data packet. Alternatively or in addition, a traffic type of the data packet may include information about the communication of the data packet in the network. For example, the traffic type of the data packet may be variously based on information which includes, but is not limited to, a port on which the data packet was received, a time when the data packet was received, and/or an indication that the receiving of the data packet results in the exceeding of some threshold value. For purposes of illustration, descriptions of the invention herein will be described in an exemplary case of the network condition for data packet redirection being a traffic type of the data packet itself. It is understood that these descriptions may be extended to refer to other types of network conditions.

Where a network condition results in the data packet being redirected 115 to network service 120, an analysis of the data packet may be performed as part of the provided service of network service 120. Based at least in part on a result of the analysis, the redirected data packet may be dropped (not shown) by network service 120. Alternatively, the data packet may, at 125, be returned to switching device 110 based at least in part on the result of the analysis. In the case of the data packet being returned, the switching device 110 may perform any additional analysis or other operations on the returned data packet. Thereafter, the switching device 110 may either drop the returned data packet (not shown), or forward the returned data packet, at 135, to the one or more destinations in network 140.

Figure 2:
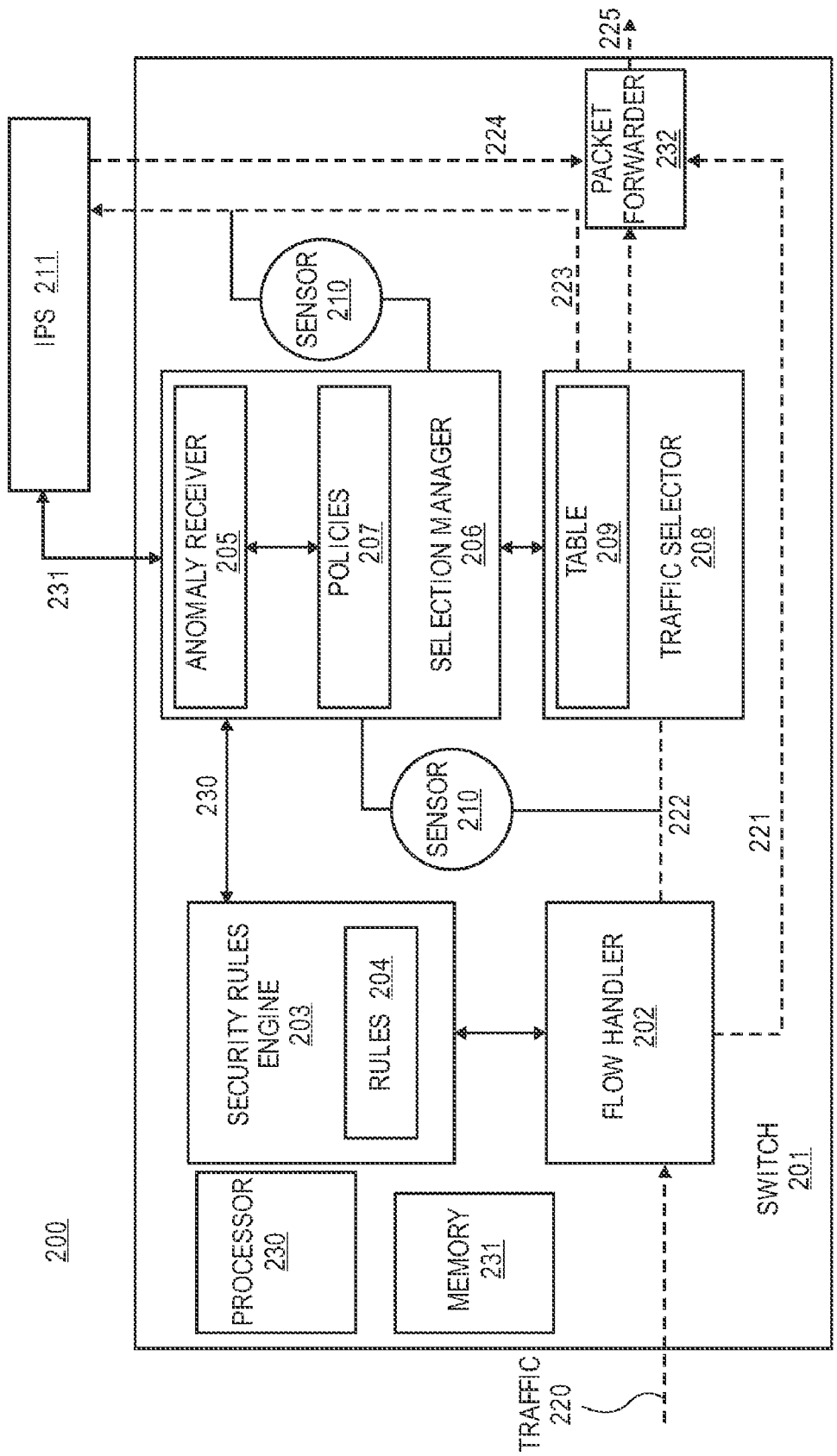
FIG. 2 is a block diagram illustrating mechanisms of a switch capable of performing a port redirect of a data packet according to one embodiment of the invention.

FIG. 2 illustrates a configuration 200 to implement one embodiment of the invention. For illustrative purposes, configuration 200 shows additional features over those of FIG. 1. It should be noted that other embodiments of the invention may include configurations which are alternative or additional to those show in FIG. 2. One embodiment of the invention may be implemented by a switching device which can selectively redirect network traffic for inspection by one or more security services, where the redirecting is based on some list of network characteristic identifiers. In one embodiment, the list of network identifiers may be subject to modification according to a set of one or more policies. Like the switching device 110 in system 100 FIG. 1, switch 201 in configuration 200 may selectively redirect data packets from received network traffic to a port associated with an IPS 211. In one embodiment of the invention, switch 201 may include a processor 230 to implement at least part of a logic for the selective port redirection of data packets. For example, processor 230 may include a machine-readable memory 231, which may have stored thereon one or more instructions which when executed by processor 230 cause the processor 230 to perform at least part of the selective port redirection of a data packet to a port on switch 201 which is associated with IPS 211. Alternatively or in addition, switch 201 may implement at least part of the selective port redirection of data packets using hardware.

According to configuration 200, switch 201 may receive traffic 220 at flow handler 202 (e.g. via a port, bus connection or other interface), which identifies flows that have previously been analyzed and determined by the IPS 211 to be safe for the network. Flow handler 202 may further include, for example, a mechanism to determine whether a data packet is to be flooded from switch 201. Alternatively, this determination may be made by a dedicated component of switch 201 (not shown), separate from flow handler 202. Data packets from such flows are forwarded directly through switch 201 without further interruption. Otherwise, any other data packet 222 may be sent to traffic selector 208. Traffic selector 208 may determine whether a network condition indicates that the received data packet is associated with (e.g. carries traffic to) a redirect port of the switching device. Traffic selector 208 may further determine whether the data packet is a data packet to be flooded from the switching device, depending on the particular embodiment of the invention. In one embodiment, traffic selector 208 may identify a traffic type of data packet 222 for redirection to a port on switch 201 which is associated with IPS 211. In one example, the identification of traffic types to be redirected may be made on a per flow basis or a per-service (e.g., email, web, SQL, FTP, etc.) basis.

Based at least in part on the data packet 222 being of a traffic type indicated as having an association with a port associated with IPS 211, the data packet may be redirected to said "redirect port". Traffic selector 208 is shown as redirecting 223 data packets in switch 201. Alternatively, this redirecting 223 may be performed by a dedicated switching mechanism of switch 201 (not shown) which is separate from mechanism in traffic selector 208 to determine whether a network condition indicates that the received data packet is associated with a redirect port.

The IPS may receive redirected data 223, for example, via any of a coaxial cable, a twisted pair cable, a parallel bus, a serial bus, etc. Traffic selector 208 may include a table 209 having entries that identify flows and/or services that have been flagged for further packet inspection. In this case, a data packet associated with a service that matches an entry in table 209 may be redirected to a port on switch 201 associated with IPS 211. Table 209 may be implemented in a cache or memory. In one embodiment, table 209 is implemented in a content addressable memory (CAM). In another embodiment, a ternary CAM, or TCAM, is used to implement the table IPS 211 may analyze redirected traffic 223 to determine whether a particular flow is good (e.g., safe, not a threat, etc.) or bad (e.g., viruses, worms, denial of service (DoS) attacks, etc.). For example, an IPS device might determine that a particular flow (e.g., flow A) is a good flow. Data packets from good flows 224 may be returned to a packet forwarder 232, which may perform further analysis and/or other operations on a returned data packet. After any additional analysis or other operations, packet forwarder 232 may either drop a returned data packet or send the returned data packet as outbound network traffic 225 of switch 201. The IPS 211 may send a notification to flow handler 202 identifying flow A as a good flow. The switch 201 may store a flow identifier for flow A in memory 231. Thus, once a flow identifier for flow A is stored in the memory, any subsequently received packets associated with flow A may generate a match in flow handler 202 with the flow A identifier in memory 231, which may cause the switch 201 to forward the flow A packets, at 221, through the switch 201, at 225, without passing them through traffic selector 208 or redirecting them to IPS 211.

For data which is passed from flow handler 202 to traffic selector 208, table 209 is used to identify services and/or flows of the data and compare them services and/or flows that have been flagged for vulnerability inspection. The entries in table 209 may be dynamically/automatically updated based on current overall switch traffic conditions. Overall switch traffic conditions may be detected by sensors 210. In one embodiment, switch 201 may include a first sensor 210 to monitor traffic passed from flow handler 202 to traffic selector 208 and a second sensor 210 to monitor traffic between traffic selector 208 and IPS 211. In other embodiments, switch 201 can include any combination of one or more sensors at various locations within the switch 201 to monitor traffic and detect conditions.

Sensors 210 may collect various packet statistics such as cumulative packet counts for one or more flows, a change or delta in a packet count over a time interval, a ratio of two cumulative packet counts, and/or a ratio of a change or delta in two different packet counts over a time interval. Given that services (e.g., email, SQL, FTP, etc.) typically communicate using a standard port number, sensors can also track packet counts, changed traffic rates, and ratios based on service type. Sensors 210 may also collect statistics for reverse/outbound traffic associated with a flow. For example, in one embodiment, the sensors track the number of incoming Transmission Control Protocol (TCP) synchronize (SYN) packets received for a particular flow. Meanwhile, the sensors can also track the number of outbound TCP SYN-acknowledge (SYN-ACK) packets associated with the flow.

Sensors 210 may report detected conditions to a selection manager 206. Selection manager 206 includes a set of one or more policies 207. This set of policies 207 may be implemented as a policy database. Detected conditions (e.g., a spike in traffic, traffic congestion, etc.) are analyzed using the rules and/or thresholds of the set of policies 207 to determine whether a service or flow associated with a detected condition warrants further inspection by IPS 211. In one embodiment, sensors 210 may detect an abnormal increase in email traffic entering switch 201. If the abnormality triggers a rule or exceeds a threshold of one of the set of policies 207, then selection manager 206 may automatically update table 209 to include email traffic. Thus, any subsequent email traffic received by traffic selector 208 may be redirected to IPS 211 for vulnerability detection. In another embodiment, sensors 210 may detect congestion in redirected traffic 223 due to the limited bandwidth of IPS 211. In this case, selection manager 206 may automatically modify table 209 by removing one or more services as needed to reduce the redirected traffic 223 flowing to IPS 211.

To allow dynamic updates to traffic selection policies 207 without requiring manual configuration and/or an interruption to the performance of switch 201, an embodiment of the invention may include anomaly receiver 205 to receive and process anomaly detection information for use by switch 201. As used herein, "anomaly detection" is understood to refer to any of a variety of analytical methods, well known in the networking arts, which are performed to determine potential security risks to a network. Anomaly detection information may be generated from analysis of the contents of a single data packet, for example, and/or from analysis of patterns across numerous data packets, flows, services, etc. over time. For example, anomaly detection information of the type received at anomaly receiver 205 may include, but is not limited to: malware descriptions, signature-based intrusion detection data, profile-based intrusion detection data, traffic pattern matching data, stateful traffic pattern matching data, protocol decode-based analysis data, heuristic-based analysis data, etc.

Anomaly detection information such as that received at anomaly receiver 205 may, in various embodiments, be used to generate actions to be communicated to mechanisms handling data in network traffic—e.g. traffic selector 208, security rules engine 203 and/or IPS 211. In the example of FIG. 2, selection manager 206 may, based on received anomaly detection information, generate any of a variety of such actions and/or various corresponding conditions under which said actions may be performed. One example of a condition which may used to determine whether and/or how a data handling actions may be taken is the state of a given alert level. For example, one of the mechanisms in switch 201 such as traffic selector 208 may store or otherwise have access to an alert level (not shown) indicating an existing security threat to at least part of configuration 200. In determining an action to take in handling received traffic 222, traffic selector 208 may compare this alert level to the conditions provided by selection manager 206. Such actions and/or conditions may be selectively communicated to the mechanisms handling data in network traffic, for example via connection 231 and/or connection 230. Connection 231 may be, for example, any of a coaxial cable, a twisted pair cable, a parallel bus, a serial bus, etc.

Anomaly detection information to be received at anomaly receiver 205 may originate from any of a variety of sources, a selection of which is shown by way of illustration in FIG. 2. First, FIG. 2 shows IPS 211 providing anomaly detection information to anomaly receiver 205—in this case via a connection 231 to selection manager 206. Second, switch 201 is shown to include a security rules engine 203, coupled to flow handler 202, which may provide anomaly detection information to anomaly receiver 205—in this case via a connection 230 to selection manager 205. Security rules engine 203 may, for example, be a module to analyze traffic 220 and provide first-order threat detection and mitigation at flow handler 202 by deriving and/or enforcing a set of security rules 204 based on said traffic analysis. An example of such a security rules engine 203 is the Extreme Networks® CLEAR-Flow Security Rules Engine, which may determine whether to filter, redirect, block, and/or forward services and/or flows based on network traffic analysis and security rules such as rules 204. Furthermore, a security rules engine 203 such as a CLEAR-Flow Security Rules Engine may also relay to anomaly receiver 205 any anomaly detection information resulting from this network traffic analysis. Third, the information provided by various sensors 210 internal to switch 201 may be received by anomaly receiver 205. Still other sources of anomaly detection information—not shown in FIG. 2—may include security detection and/or mitigation agents operating on network traffic which is external to switch 201.

A source of anomaly detection information may communicate with anomaly receiver 205 by a variety of means including, but not limited to: polling by anomaly receiver 205, sending of a recognized interrupt by the source of the anomaly detection information, and/or an agreed-upon data communication protocol. Upon receipt by anomaly receiver 205, anomaly detection information may be processed and communicated to selection manager 206 for use in updating policies 207 and/or table 209. In one embodiment of the invention, policies 207 may be updated dynamically without having to reboot some part of a data processing system in switch 201. This may be achieved, for example, by implementing at least some of the functions of selection manager 206 as one or more independent components of a modular operating system. By using a modular operating system or similar technology to isolate the runtime operation of certain components of configuration 200, these components may be updated in real time without interrupting the handling of received network traffic 220 by switch 201. One example of such a modular approach is to implement at least part of the selection manager as a module of an Extreme Networks® ExtremeXOS™ modular operating system.

While not all of the features in configuration 200 may not be required to practice certain embodiments of the invention, the above-discussed features demonstrate the wide variety of network conditions which may be used in determining a port redirection of a data packet by switch 201. For example, while the port redirect is being implemented on OSI layer 2, the network condition upon which the port redirect is based may be indicated by network information which is unrelated to any OSI layer 2 data contained in the redirected data packet.

In the course of processing a data packet, switch 201 may be able to store and/or update an current indication of where the data packet is to be sent, the indication based at least in part on that processing of the data packet which switch 201 has performed thus far. In the simplest case, memory 231 includes a block of data which is associated with the data packet upon the data packet's arrival at switch 201. A first indication of where the data packet is to be sent may be written into memory 231 after a processing of the data packet by flow handler 202, for example. This current indication in memory 231 may include a single port identifier, for example, or a port tag index (PTI) such as a bitmap wherein each set "bit" indicates a port on switch 201 which is currently considered a port to which the data packet is to be sent. In one embodiment, the stored indication of where the data packet is to be sent may be based on a MAC DA or an IP DA of the data packet, for example.

As the data packet is variously directed through to traffic selector 208, to IPS 211, and/or to packet forwarder 232, a "current" indication of where the data packet is to be sent becomes a "previous" indication when, for example, the data in memory 231 is written over or added to by a newer "current" indication of where the data packet is to be sent. In one embodiment, the switch 201 may store both a new current indication of where the data packet is to be sent, and one or more of the older indications. Eventually, the most current indication of where the data packet is to be sent may then be read from memory 231 prior to the data packet being sent from the switch 201, to determine the final one or more destination ports for the data packet.

In various other embodiments of the invention, individual components in switch 201 may variously support a storing of one or more indications of where the data packet is to be sent. For example, one or more of flow handler 202, traffic selector 208, and/or packet forwarder 232 may each maintain their own data structures to variously store, track and or provide one or more indications of where the data packet is (or was) to be sent. For the purposes of practicing one embodiment of the invention, a stored indication of where the data packet is to be sent may be readily retrievable, allowing switch 201 to more quickly implement port redirection methods, as is discussed herein.

Figure 3:
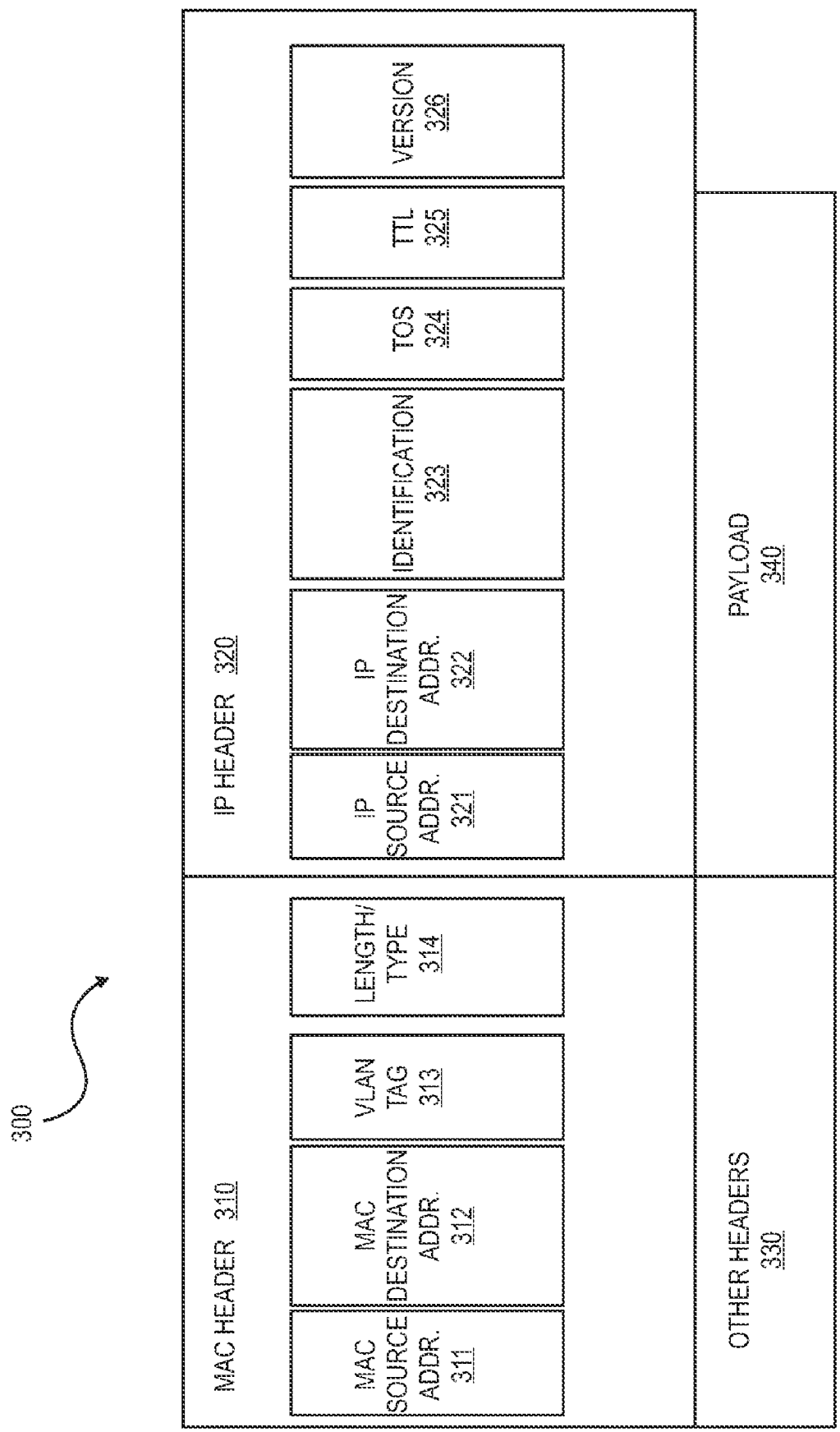
FIG. 3 is a packet diagram illustrating the contents of a data packet capable of being redirected according to one embodiment of the invention.

FIG. 3 illustrates an exemplary structure of a data packet 300 which may be redirected to a port associated with a network service according to one embodiment of the invention. The exact contents and/or structure of data packet 300 may vary based on the particular protocols used in transmitting and/or encapsulating the data therein. Data packet may include a payload 340 of data which is to be communicated from a network source to one or more network destinations. The payload 340 may be encapsulated by one or more headers in the course of its being sent through a network. For example, data packet 300 may include a media access control (MAC) header 310, such as one conforming to the Institute of Electrical and Electronics Engineers (IEEE) 802.3, which may include a MAC source address 311 indicating a MAC address of a source from which the data packet came, a MAC destination address 312 indicating at least one destination to which the data packet is to be sent, a VLAN tag 313 indicating a Virtual Local Area Network (VLAN) to which the data packet belongs and a Length/Type field 314 indicating at least one of a length or a protocol type of payload 340. Data packet 300 may also include an internet protocol (IP) header, which may include an IP source address 311 indicating an IP address of a source from which the data packet came, an IP destination address 312 indicating at least one destination to which the data packet is to be sent, an identification field 323 indicating the data packet as a fragment of a particular datagram, a type of service (TOS) field indicating requested parameters for the handling of the data packet, a time to live (TTL) field indicating the lifetime of the datagram and a version field 326 indicating a particular format of the IP packet header 320.

The various fields in MAC header 310 and IP header 320 are each an example of a traffic type of data packet 300 which may determine whether data packet 300 is to be redirected to a redirect port in a switch which is associated with a network service. In various embodiments of the invention, data packet 300 may, alternatively or in addition, be redirected to a redirect port based at least in part on one or more fields in other headers 330 of data packet 300, information in the payload 340 and/or overall switch traffic conditions such as those detected by sensors 210.

For illustrative purposes, the redirecting of data packet 300 will be discussed herein with reference to configuration 200. It is understood, however, that in varying embodiments of the invention configuration 200 may redirect other types of data packets, and that data packet 300 may alternatively be redirected according to various embodiments of the invention implemented by configurations other than configuration 200. In this illustrative case, data packet 300 is received at switch 201 and sent to traffic selector 208 for determining whether a network condition indicates that the data packet 300 is associated with a redirect port of switch 201 which is associated with IPS 211. According to one embodiment of the invention, the redirecting of data packet 300 from switch 201 to a port associated with IPS 211 is further based at least in part on whether the data packet is a data packet to be flooded from switch 201.

As used herein, flooding a data packet from a switch refers generally to a sending the data packet to many network paths in the absence of an indication that the data packet should instead be sent to a particular one or more network paths. For switching on the data link layer, flooding a data packet from a switching device refers more particularly to sending the data packet to a number of possible ports of the switching device in the absence of an indication that the data packet should instead be sent to a particular port or ports of the switching device. For the sake of brevity and clarity, data packet flooding will be discussed in reference to data link layer flooding. It is understood to one of ordinary skill in the networking art that references to flooding in descriptions of embodiments of the invention herein may be extended to include other types of data flooding, such as network layer IP multicasting.

Data packet 300 may be flooded from switch 201 in the case where the MAC destination address (DA) 312 is a broadcast MAC DA indicating generally that the data packet is to be broadcast from all ports of switch 201. Alternatively, data packet 300 may be flooded from switch 201 in the case where the MAC DA 312 is a MAC address which is unknown to switch 201. This case may occur, for example, when the switch 201 attempts to perform a lookup of the MAC DA 312 in a forwarding database (FDB) to determine a port associated with the MAC DA 312. In cases where the FDB lookup results in a miss, the switch 201 may in certain circumstances flood the data packet 300 to one or more ports of switch 201, absent an indication that the data packet 300 should instead be sent to a particular port.

The possibility of IPS 211 returning a redirected data packet to switch 201 may lead to problems such as data packets being sent on incorrect ports and/or data packet loops. This is particularly true in the case of a data packet which is to be flooded from switch 201. Accordingly, an embodiment of the invention includes in the selective redirecting of data packet 300 an assessment of whether data packet 300 is one of these potentially problematic data packets to be flooded from switch 201. Examples of how this assessment may be included as part of a port redirect is discussed below In varying embodiments of the invention, additional measures are taken to assure that data packets are sent reliably in the network through switch 201. For example, the redirect port carrying traffic to IPS 211 may be isolated from any flooding of data packets from the switching device 201. This prevents any inadvertent redirecting of data packet 300 to IPS 211, as when data packet 300 is determined to not be associated with a redirect port of the switch 201, but data packet 300 is nevertheless a data packet to be flooded from switch 201. If the redirect port is allowed to carry flooded traffic, then IPS 211 is needlessly sent traffic which has either not been identified as needing analyzing or has been identified as not needing analyzing. The isolation of a redirect port may, for example, comprise excluding the redirect port from a set of ports carrying traffic of (or otherwise supporting) a particular virtual local area network (VLAN).

Additionally or in the alternative, switch 201 may be configured such that no MAC learning is performed on the redirect port carrying returned traffic from IPS 211 back to switch 201. MAC learning causes the switch 201 to associate a particular source MAC address of a data packet with the port of the switch on which that data packet was received. Insofar as the MAC source address 311 should be associated with where the data packet 300 originally came from—i.e. the port carrying traffic 220—and not the redirect port returning data packets from IPS 211, MAC learning should be turned off for the return redirect port in order to prevent a MAC move—an undesirable relearning of a port associated with a given MAC source address. Various well-known methods of switch configuration for turning off MAC learning on a network port are supported commercially, and are not detailed herein except as needed to describe the operation of an embodiment of the invention.

Figure 4A:
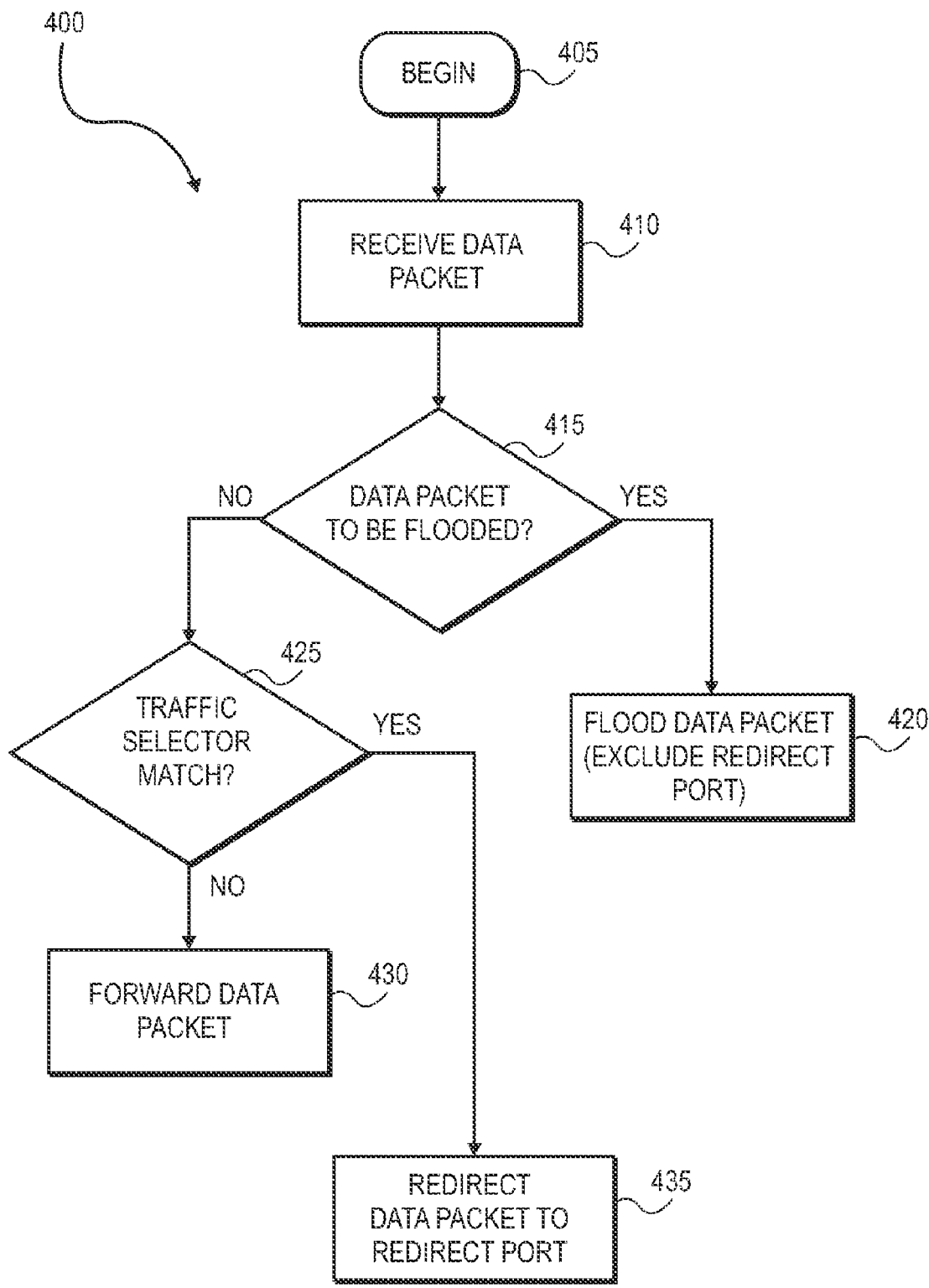
FIG. 4A is a flow diagram illustrating a method of port redirection according to one embodiment of the invention.

FIG. 4A illustrates a method 400 of selectively performing a port redirect of a data packet to a network service according to one embodiment of the invention. This method may, for example, be performed by the traffic selector 208 of switch 201 shown in FIG. 2. The method 400 begins, at 405, with a switching device ready to perform redirection of a data packet to a port associated with a network service. At 410, a data packet is received by the switching device, the data packet to be directed to one or more destinations in a network. Upon receipt of the data packet, a determination is made, at 415, as to whether the received data packet is to be flooded from the switching device. As discussed previously, this flooding may be indicated by a broadcast MAC DA of the data packet or by an FDB lookup of the MAC DA of the data packet resulting in a miss, for example.

For the case of an IP multicast data packet, determining that the data packet is to be flooded from the switching device may be indicated by determining that the data packet includes an multicast IP DA such as one described in the Internet Assigned Numbers Authority (IANA) "IANA Guidelines for IPv4 Multicast Address Assignments", Albanna, Z., Almeroth, K., Meyer, D., and M. Schipper, Best Current Practice (BCP) 51, Request for Comments (RFC) 3171, August 2001. This may be accomplished, for example, by adding an entry in a traffic selector ACL to catch any multicast traffic on a redirect port. For example, the ACL entry may be set to respond to traffic with an IP DA 224.0.0.0, in order to catch IP multicast traffic.

Where the data packet is to be flooded, then the data packet is flooded from the switching device, at 420, without the data packet having been previously redirected to a redirect port associated with a network service. In one embodiment, the flooding of the data packet from the switching device at 420 excludes the sending of the data packet on a redirect port. Where the data packet is not to be flooded from the switching device, a determination is made, at 425, as to whether traffic selector match has occurred—e.g. whether a traffic type of the data packet (or similar network condition) indicates an association of the data packet with a redirect port of the switching device. If there is a traffic selector match, at 435, the data packet is redirected to a redirect port associated with a network service. If there is no traffic selector match, at 430, the data packet is forwarded—in this case, directed—from the switching device to one or more destinations of the data packet without the data packet having first been redirected to a network service for further analysis. While traffic selector 208, for example, may include the logic to perform all of method 400, in alternate embodiments, the mechanism to determine whether a data packet is to be flooded from a switching device may be implemented separate from the mechanism to determine whether there is a traffic selector match.

Figure 4B:
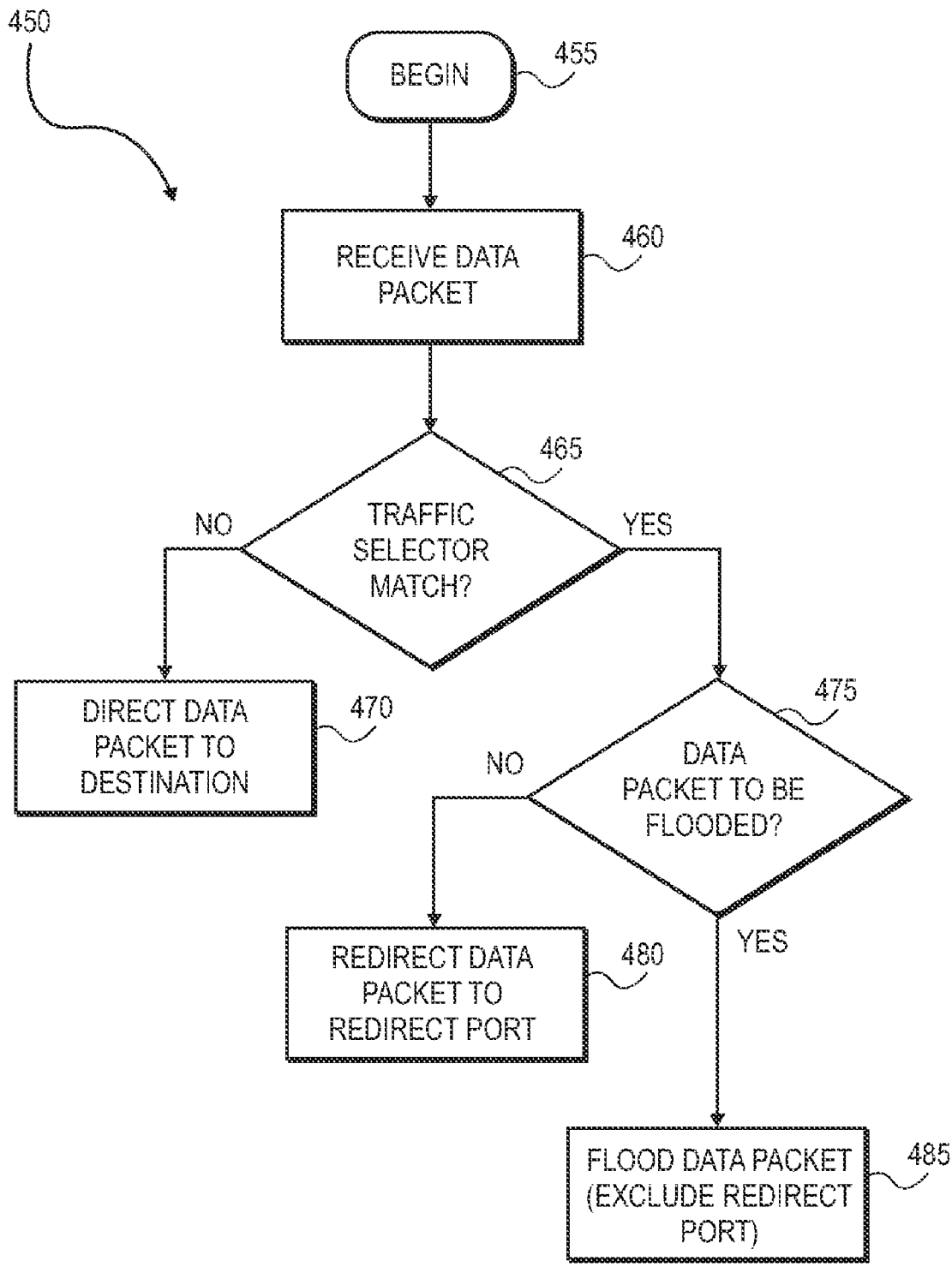
FIG. 4B is a flow diagram illustrating a method of port redirection according to another embodiment of the invention.

FIG. 4B illustrates a method 450 of selectively performing a port redirect of a data packet to a network service according to another embodiment of the invention. This method may, for example, be performed by the switch 201 in configuration 200 shown in FIG. 2. The method 450 begins, at 455, with a switching device ready to perform redirection of a data packet to a port associated with a network service. At 460, a data packet is received by the switching device, the data packet to be directed to one or more destinations in a network. Upon receipt of the data packet, a determination is made, at 465, as to whether traffic selector match has occurred—e.g. whether a traffic type of the data packet (or similar network condition) indicates an association of the data packet with a redirect port of the switching device. If there is no traffic selector match, at 470, then the data packet is directed from the switching device to one or more destinations of the data packet without the data packet having first been redirected to a network service for further analysis.

If there is a traffic selector match, then a determination is made at 475, as to whether the received data packet is to be flooded from the switching device. As discussed previously, this flooding may be indicated by a broadcast MAC DA of the data packet or by an FDB lookup of the MAC DA of the data packet resulting in a miss, for example. Where the data packet is to be flooded, then the data packet is flooded from the switching device, at 485, without the data packet having been previously redirected to a redirect port associated with a network service. In one embodiment, the flooding of the data packet from the switching device at 420 excludes the sending of the data packet on a redirect port. Where the data packet is not to be flooded, at 480, then the data packet is redirected to a network service for further analysis. As with the method 400, the mechanism to determine whether a data packet is to be flooded from a switching device may be implemented either together with or separate from the mechanism to determine whether there is a traffic selector match.

Depending on the particular implementation of an embodiment of the invention, and depending on the particular data packet being selectively redirected, the particular embodiment of the invention may store any number of different indications of where the data packet is to be sent as the data packet is processed by the switching device. For example, the data packet being received at 460 may be followed by a storing of a PTI indicating that the data packet is to be sent to one or more ports associated with a MAC DA of the data packet. However, a determination at 465 that there is a traffic selector match may be followed by a storing of another PTI indicating that the data packet is to be sent to a redirect port. Finally, a determination at 475 that the data packet is to be flooded from the switching device may result in a need to again store a PTI, this time to indicate that the data packet is to be flooded from the switching device.

In the simplest case, an embodiment of the invention may simply look at a MAC DA of the data packet again. However, this may result in wasteful redirecting of the data packet and, for example, repetitive and resource-consuming FDB lookups. In another embodiment of the invention, the correct indication of the one or more destination ports of the data packet may be retrieved from one of the previously stored indications.

For example, a determination at 475 that the data packet is to be flooded from the switching device may result in the triggering of special instructions stored in a sequence control table (SCT). These SCT instructions may be stored, for example, in memory 231 for execution by processor 230. In one embodiment of the invention, the SCT instructions retrieve some previously-stored indication of those ports of the switching device to which the data packet is to be flooded. In one embodiment, execution of the SCT instructions results in a retrieval of an indication of where the data packet is to be sent which is based on either a MAC DA or an IP DA of the data packet. This retrieved indication may then replace the most recent indication of where the data packet is to be sent, and determine the actual sending of the data packet from the switching device.

Techniques and architectures for redirecting data packets in a switching device are described herein. In the description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the networking arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

What is claimed is:

1. A method at a switching device in a network, the method comprising:
   receiving a data packet to be directed to one or more destinations in the network;
   determining whether a condition of the network indicates that the received data packet is associated with a redirect port of the switching device, wherein the redirect port is associated with a network service configured to return a redirected data packet to the switching device based on an analysis of the redirected data packet;
   determining whether the received data packet is to be flooded from multiple ports of the switching device, wherein the received data packet is to be flooded from the multiple ports of the switching device if it is determined that the received data packet includes a broadcast destination address, or if it is determined that the received data packet includes a destination address which fails to correspond to any entry in a forwarding database;
   where it is determined that the received data packet is to be flooded, flooding the received data packet from the multiple ports of the switching device, wherein the redirect port is isolated from the flooding of the received data packet; and
   where it is determined that the condition of the network indicates that the received data packet is associated with the redirect port and where it is determined that the received data packet is not to be flooded from the switching device, redirecting the received data packet to the redirect port.

2. The method of claim 1, wherein the condition of the network includes a traffic type of the received data packet.

3. The method of claim 1, wherein determining whether the received data packet is to be flooded from the switching device comprises at least one of,
   determining whether the received data packet includes a broadcast media access control (MAC) destination address, and
   determining whether the received data packet includes a media access control (MAC) destination address which fails to correspond to any entry in the forwarding database.

4. The method of claim 1, wherein determining whether the data packet is to be flooded from the switch comprises determining whether the received data packet includes an internet protocol (IP) multicast destination address.

5. The method of claim 1, wherein the flooding the received data packet from the switching device is performed without sending the received data packet to any redirect port of the switching device.

6. The method of claim 5, wherein the redirect port is isolated from any flooding of data packets from the switching device.

7. The method of claim 6, wherein the redirect port is excluded from a set of ports supporting a Virtual Local Area Network (VLAN).

8. The method of claim 5, wherein it is determined that the condition of the network indicates that the received data packet is associated with a redirect port of the switching device, and wherein flooding the received data packet from the switching device comprises replacing an indication that the received data packet is to be sent to the redirect port of the switching device with an indication that the received data packet is to be flooded to at least one other port of the switching device.

9. The method of claim 8, wherein replacing an indication that the received data packet is to be sent to the redirect port of the switching device with an indication that the received data packet is to be flooded to at least one other port of the switching device comprises executing one or more commands stored in a sequence control table (SCT) to retrieve an identifier of the at least one other port of the switching device.

10. The method of claim 5, wherein it is determined that the condition of the network indicates that the received data packet is associated with a redirect port of the switching device, and wherein flooding the received data packet from the switching device comprises enforcing a rule of an access control list for the redirect port of the switching device, the rule to prevent redirection to the redirect port of the switching device of any data packets having an internet protocol (IP) multicast destination address.

11. A non-transitory machine-readable storage medium having stored thereon a set of instructions which when executed by one or more processors cause the one or more processors to perform a method comprising:
receiving a data packet to be directed to one or more destinations in the network;
determining whether a condition of the network indicates that the received data packet is associated with a redirect port of the switching device, wherein the redirect port is associated with a network service configured to return a redirected data packet to the switching device based on a result of an analysis of the redirected data packet;
determining whether the received data packet is to be flooded from multiple ports of the switching device, wherein the received data packet is to be flooded from the multiple ports of the switching device if it is determined that the received data packet includes a broadcast destination address, or if it is determined that the received data packet includes a destination address which fails to correspond to any entry in a forwarding database;
where it is determined that the received data packet is to be flooded, flooding the received data packet from the multiple ports of the switching device, wherein the redirect port is isolated from the flooding of the received data packet; and
where it is determined that the condition of the network indicates that the received data packet is associated with the redirect port and where it is determined that the received data packet is not to be flooded from the switching device, redirecting the received data packet to the redirect port.

12. The machine-readable storage medium of claim 11, wherein the condition of the network includes a traffic type of the received data packet.

13. The machine-readable storage medium of claim 11, wherein determining whether the received data packet is to be flooded from the switching device comprises at least one of,
determining whether the received data packet includes a broadcast media access control (MAC) destination address,
determining whether the received data packet includes a media access control (MAC) destination address which fails to correspond to any entry in the forwarding database, and
determining whether the received data packet includes an internet protocol (IP) multicast destination address.

14. The machine-readable storage medium of claim 11, wherein the flooding the received data packet is performed without sending the received data packet to any redirect port of the switching device.

15. The machine-readable storage medium of claim 14, wherein flooding the received data packet from the switching device without sending the received data packet to any redirect port of the switching device comprises excluding the redirect port of the switching device from a set of ports supporting a Virtual Local Area Network (VLAN).

16. The machine-readable storage medium of claim 14, wherein a condition of the network indicates that the received data packet is associated with a redirect port of the switching device, and wherein flooding the received data packet from the switching device comprises replacing an indication that the received data packet is to be sent to the redirect port of the switching device with an indication that the received data packet is to be flooded to at least one other port of the switching device.

17. A switching device comprising:
multiple ports;
a redirect port associated with a network service configured to return a redirected data packet to the switching device based on an analysis of the redirected data packet;
a flow handler to determine whether a received data packet is to be flooded from the multiple ports of the switching device, wherein the received data packet is to be flooded from the multiple ports of the switching device if it is determined that the received data packet includes a broadcast destination address, or if it is determined that the received data packet includes a destination address which fails to correspond to any entry in a forwarding database;
a traffic selector to determine whether a condition of a network indicates that the received data packet is associated with the redirect port; and
a switching mechanism coupled to the traffic selector and to the flow handler, wherein:
where it is determined that the condition of the network indicates that the received data packet is associated with the redirect port, and where it is determined that the received data packet is not to be flooded from the switching device, the switching mechanism to redirect the received data packet to the redirect port; and
where it is determined that the received data packet is to be flooded from the multiple ports of the switching device, the switching mechanism to flood the received data packet, wherein the switching mechanism to isolate the redirect port from the flooding of the received data packet.

18. The switching device of claim 17, wherein the condition of the network includes a traffic type of the recieved data packet.

19. The switching device of claim 17, wherein determining whether the received data packet is to be flooded from the switching device comprises at least one of,
determining whether the received data packet includes a broadcast media access control (MAC) destination address, determining whether the received data packet includes a media access control (MAC) destination address which fails to correspond to any entry in a forwarding database, and determining whether the received data packet includes an internet protocol (IP) multicast destination address.

20. The switching device of claim 17, wherein flooding the received data packet from the switching device without sending the received data packet to the redirect port comprises excluding the redirect port from a set of ports supporting a Virtual Local Area Network (VLAN).

21. The switching device of claim 17, wherein it is determined that the condition of the network indicates that the received data packet is associated with a redirect port of the switching device, and wherein flooding the received data packet from the switching device comprises replacing an indication that the received data packet is to be sent to the redirect port of the switching device with an indication that the received data packet is to be flooded to at least one other port of the switching device.

22. A system comprising:
a switching device having,
multiple ports;
a redirect port, and
a switching mechanism coupled to the multiple ports and to the redirect port, wherein:
where it is determined that a condition of a network indicates that a received data packet is associated with the redirect port, and where it is determined that the received data packet is not to be flooded from the switching device, the switching mechanism to redirect the received data packet to the redirect port; and
where it is determined that the received data packet is to be flooded from the switching device, the switching mechanism to flood the received data packet from the switching device, wherein the switching mechanism to isolate the redirect port from the flooding of the received data packet, wherein the received data packet is to be flooded from the multiple ports of the switching device if it is determined that the received data packet includes a broadcast destination address, or if it is determined that the received data packet includes a destination address which fails to correspond to any entry in a forwarding database;
a network service to receive the redirected data packet from the redirect port of the switching device, the network service further to return the redirected data packet to the switching device based on an analysis of the redirected data packet; and
a serial bus coupling the switching device to the network service.

23. The system of claim 22, wherein the condition of the network includes a traffic type of the received data packet.

24. The system of claim 22, wherein the received data packet is not to be flooded from the switching device unless:
the received data packet includes a broadcast media access control (MAC) destination address,
the received data packet includes a media access control (MAC) destination address which does not correspond to any entry in a forwarding database of the switching device, or
the received data packet includes an internet protocol (IP) multicast destination address.

25. The system of claim 22, wherein the redirect port is excluded from a set of ports supporting a Virtual Local Area Network (VLAN).

26. The system of claim 22, wherein it is determined that the condition of the network indicates that the received data packet is associated with a redirect port of the switching device, and wherein flooding the received data packet from the switching device comprises replacing an indication that the received data packet is to be sent to the redirect port of the switching device with an indication that the received data packet is to be flooded to at least one other port of the switching device.

27. The system of claim 26, wherein replacing an indication that the received data packet is to be sent to the redirect port of the switching device with an indication that the received data packet is to be flooded to at least one other port of the switching device comprises executing one or more commands stored in a sequence control table (SCT) to retrieve an identifier of the at least one other port of the switching device.

28. The system of claim 22, wherein it is determined that the condition of the network indicates that the received data packet is associated with a redirect port of the switching device, and wherein flooding the received data packet from the switching device comprises enforcing a rule of an access control list for the redirect port of the switching device, the rule to prevent redirection to the redirect port of the switching device of any data packets having an internet protocol (IP) multicast destination address.

* * * * *